United States Patent
Mattis et al.

(10) Patent No.: US 10,135,065 B2
(45) Date of Patent: Nov. 20, 2018

(54) COMPOSITE ANODE MATERIAL INCLUDING NICKEL OXIDE AND THE METHOD FOR PREPARING THE SAME

(71) Applicant: Microvast Power Systems Co., Ltd., Huzhou, Zhejiang Province (CN)

(72) Inventors: Wenjuan Mattis, Stafford, TX (US); Huijie Guo, Huzhou (CN)

(73) Assignee: MICROVAST POWER SYSTEMS CO., LTD., Huzhou, Zhejiang Province (CN)

( * ) Notice: Subject to any disclaimer, the term of this patent is extended or adjusted under 35 U.S.C. 154(b) by 308 days.

(21) Appl. No.: 15/015,096

(22) Filed: Feb. 3, 2016

(65) Prior Publication Data
US 2016/0226062 A1 Aug. 4, 2016

(30) Foreign Application Priority Data
Feb. 3, 2015 (CN) .......................... 2015 1 0056494

(51) Int. Cl.
*H01M 4/04* (2006.01)
*H01M 4/52* (2010.01)
(Continued)

(52) U.S. Cl.
CPC ............ *H01M 4/366* (2013.01); *C01G 53/04* (2013.01); *H01M 4/525* (2013.01); *H01M 4/58* (2013.01);
(Continued)

(58) Field of Classification Search
CPC ........ H01M 4/366; H01M 4/525; H01M 4/58; H01M 10/0525; H01M 2220/20;
(Continued)

(56) References Cited

U.S. PATENT DOCUMENTS

| 2010/0285358 A1* | 11/2010 | Cui | H01M 4/134 429/218.1 |
| 2013/0244087 A1* | 9/2013 | Ma | H01M 4/362 429/163 |
| 2015/0194669 A1* | 7/2015 | Inoue | H01M 4/134 429/217 |

FOREIGN PATENT DOCUMENTS

| CN | 102479948 A | 5/2012 |
| CN | 102983308 A | 3/2013 |

(Continued)

OTHER PUBLICATIONS

L. Yuan, Z. P. Guo, K. Konstantinov, P. Munroe, H. K. Liu, "Spherical Clusters of NiO Nanoshafts for Lithium-Ion Battery Anodes", Electrochemical and Solid-State Letters, Sep. 8, 2006, pp. A524-A528, vol. 9, Issue 11, The Electrochemical Society.

(Continued)

*Primary Examiner* — Lisa S Park
(74) *Attorney, Agent, or Firm* — Cheng-Ju Chiang (57) ABSTRACT

The present invention provides a composite anode material including nickel oxide, a method for preparing the composite anode material, and a lithium ion battery using the composite anode material. The composite anode material has a core-shell structure, the inner core is an inert core comprising a non-active material, and the outer shell comprises an anode active material of nickel oxide. The composite anode material with core-shell structure in the present invention overcomes the problem of volume changing and chalking of nickel oxide during charging/discharging and obtains a better cycle performance and rate performance.

7 Claims, 13 Drawing Sheets

(51) Int. Cl.
  *H01M 4/36* (2006.01)
  *H01M 10/0525* (2010.01)
  *H01M 4/525* (2010.01)
  *H01M 4/58* (2010.01)
  *C01G 53/04* (2006.01)

(52) U.S. Cl.
  CPC ..... *H01M 10/0525* (2013.01); *C01P 2002/72* (2013.01); *C01P 2004/03* (2013.01); *C01P 2004/62* (2013.01); *C01P 2004/64* (2013.01); *C01P 2004/80* (2013.01); *H01M 2220/20* (2013.01); *Y02E 60/122* (2013.01); *Y02T 10/7011* (2013.01)

(58) Field of Classification Search
  CPC .. C01G 53/04; C01P 2004/62; C01P 2004/03; C01P 2002/72; C01P 2004/80; C01P 2004/64; Y02T 10/7011; Y02E 60/122
  See application file for complete search history.

(56) References Cited

FOREIGN PATENT DOCUMENTS

| | | |
|---|---|---|
| CN | 103682327 A | 3/2014 |
| CN | 103956483 A | 7/2014 |

OTHER PUBLICATIONS

Yan Yao, Kaifu Huo, Liangbing Hu, Nian Liu, Judy J. Cha, Matthew T. McDowell, Paul K. Chu, Yi Cui, "Highly Conductive, Mechanically Robust, and Electrochemically Inactive TiC/C Nanofiber Scaffold for High-Performance Silicon Anode Batteries", ACS NANO Article, Oct. 5, 2011, pp. 8346-8351, vol. 5, Issue No. 10, American Chemical Society.

\* cited by examiner

FIG. 34

COMPOSITE ANODE MATERIAL INCLUDING NICKEL OXIDE AND THE METHOD FOR PREPARING THE SAME

CROSS REFERENCE TO RELATED APPLICATION

The present application is based on and claims priority of Chinese Patent Application No. 201510056494.X, filed on Feb. 3, 2015. The entire disclosure of the above-identified application, including the specification, drawings and claims are incorporated herein by reference in its entirety.

FIELD OF THE INVENTION

This invention relates to lithium ion batteries, and more particularly to a composite anode material including nickel oxide, a method for preparing the composite anode material, and a lithium ion battery using the composite anode material.

BACKGROUND OF THE INVENTION

Lithium ion batteries (hereinafter as "LIB") are widely used in various kinds of electric apparatus, and also used as power energy of electric vehicles for its higher operating voltage, higher energy density, stable discharging curve, lower self-discharging, long life cycle, memoryless property and non-pollution.

The power energy has a much higher requirement than the small scale electric apparatus for LIB. Selection of an electrode material is a key factor that affects the performance of LIB. In addition to improve the material of the positive electrode, the electrolyte and the separator, the improvement of an anode active material is also necessary. The anode active material of the existing commercial LIB is mainly graphite, which has lower lithium insertion potential and excellent intercalation/deintercalation performance. Therefore, graphite is a good anode active material for LIB. The intercalation/deintercalation of lithium ions in graphite is calculated according to stoichiometry $LiC_6$ and its theoretical capacity can reach up to 372 mAh/g. In general, the practical capacity of graphite is about 330 mAh/g, which is very close to its theoretical capacity, and it is difficult to further increase its practical capacity.

The lower capacity of carbon anode materials (such as graphite) restricts the energy density of LIB. Therefore, some non-carbon anode materials have attracted the attention of the industry because of higher energy density, wherein nickel oxide becomes new generation of anode materials of LIB for its high theoretical capacity (718 mAh/g), environmental friendly features, rich natural reserves and low cost.

As an anode material of LIB, volume change of the nickel oxide is large during the intercalation/deintercalation of lithium ions, which will easily cause the crush of the material. The poor conductivity performance of the nickel oxide leads to poor cycling stability and poor high-rate charging/discharging performance. On the other hand, the particle size and morphology of the nickel oxide also have an effect on its electrochemical performance. The structure of the nickel oxide and big particle size obtained by traditional manufacturing method causes poor conductivity performance in material and lower diffusion rate of lithium ions in nickel oxide particles, and these factors restrict the electrochemical performance of the nickel oxide and the cycling performance of the battery.

China application No. CN201310724013.9 discloses a composite anode material comprising a hollow porous nickel oxide coated by a nitrogen-doped carbon layer. Through surface modification of the hollow porous nickel oxide, the utilization rate and conductivity performance of the nickel oxide are improved. The LIB using this material as the anode active material has the characteristics of good discharging performance, high cyclic stability, and high capability.

China application No. CN201210546937.X discloses a coaxial composite anode material of carbon nanotube arrays with nickel oxide nanoparticles. The composite anode material comprises carbon nanotube arrays growing on a metal collector substrate in situ, and nickel oxide nanoparticles uniformly distributed on and directly combined with the outer surfaces of the carbon nanotube arrays, wherein the nickel oxide nanoparticles account for 50-85 percent by weight of the composite anode material. Thus, a composite anode material having high conductivity, good cycle performance, high specific capacity is obtained, and the composite anode material is not easy to aggregate and crush caused by volume change.

From the above, in order to control volume change of the nickel oxide during charging-discharging and to improve its conductivity performance, the prior art usually uses a good conductivity material such as carbon to coat the nickel oxide or combines the nickel oxide with the carbon nanotube arrays. Surface coating can solve the problems of crushing and volume changing of the nickel oxide particle during charging-discharging to a certain extent. However, because the active material of the nickel oxide is coated by a layer of carbon material, the lithium ions must pass through the coating layer firstly and then embed into the anode active material (i.e., the nickel oxide of the inner core) in the process of intercalation of lithium ions. Thus, the coating layer outside the nickel oxide will affect rate capability of the anode material as well as utilization of the inside nickel oxide. The carbon nanotube arrays growing on a metal collector substrate in situ and further combined with nickel oxide nanoparticles can be used to increase utilization of the nickel oxide, but this will raise the production cost.

SUMMARY OF THE INVENTION

The present invention provides a composite anode material including nickel oxide. The composite anode material has a core-shell structure. The inner core is an inert core comprising a non-active material. The outer shell comprises an anode active material. The anode active material includes nickel oxide. The non-active material in the present invention refers to a material that has the capacity less than 50 mAh/g. The non-active material is at least one selected from the group consisting of silicon carbide, silicon nitride and calcium carbonate.

In an embodiment of the present invention, the composite anode material including nickel oxide has a core-shell structure. The outer shell includes an anode active material of nickel oxide, and the inner core includes a non-active material selected at least one from the group consisting of silicon carbide, silicon nitride and calcium carbonate.

Silicon carbide is a covalent bond compound with a tight lattice bond. Crystalline silicon carbide is non-active to lithium ions and incapable of lithium intercalation, therefore it can not be used alone as an anode material. Silicon carbide is characterized in high intensity, high tenacity, high temperature resistance and no chalking. The silicon carbide is used as an anode active material with its capacity reaching up to 876 mAh/g. The silicon carbide is made into silicon carbide nanowires, which has a larger specific surface area and a lot of silicon atoms exposed on the surface. The lithium ion can be embedded between silicon atoms and carbon atoms, thus obtaining a higher lithium intercalation capacity. In the present invention, the silicon carbide has a covalent bond structure, with no or less capability of intercalation/deintercalation of lithium ions. Thus, the silicon carbide in the present invention can not be used alone as an anode active material.

In an embodiment, the outer shell further includes nickel hydroxide.

Preferably, a radius of the inner core is between 5 nm and 200 nm; more preferably, the radius of the inner core is between 10 nm and 100 nm.

Preferably, a thickness of the outer shell is between 1 nm and 200 nm; more preferably, the thickness of the outer shell is between 3 nm and 100 nm.

The present invention also provides a method for preparing a composite anode material including nickel oxide. The method includes the following steps: (1) providing an alkaline solution, a non-active material and an aqueous solution of a nickel compound, adding the non-active material into the aqueous solution of the nickel compound, and adding the alkaline solution for reaction, after filtering, washing and drying, intermediate products are obtained; (2) sintering the intermediate products under the protection of a reducing gas or an inert gas, then the composite anode material including nickel oxide is prepared.

Preferably, the nickel compound is at least one selected from the group consisting of nickel chloride, nickel nitrate and nickel sulfate.

Preferably, the alkaline solution is at least one selected from the group consisting of ammonia, aqueous solution of sodium hydroxide, and aqueous solution of potassium hydroxide.

In an embodiment, the non-active material is at least one selected from the group consisting of silicon carbide, silicon nitride and calcium carbonate.

Preferably, the reaction time of step (1) is between 1 hour and 20 hours, preferably between 2 hours and 10 hours.

Preferably, the method further includes a hydroxylation pretreatment step carried on the non-active material before the step (1). The hydroxylation pretreatment step includes mixing the non-active material with ammonia for reaction between 2 hours and 10 hours and then drying for later use.

In the step (2), the reducing gas is hydrogen or a mixed gas of hydrogen and inert gas. The inert gas is at least one selected from the group consisting of nitrogen, helium and argon.

In the step (2), the sintering temperature is between 200° C. and 800° C., preferably between 200° C. and 400° C. The sintering time is between 2 hours and 10 hours.

The present invention also provides a lithium ion battery (LIB) which includes the composite anode material including nickel oxide.

Usually, traditional coated anode material has an inner core made of an active material (such as silicon) and an outer coating layer made of a carbon active material or an inert material. However, the coating of the anode material in the present invention is different from that of the traditional anode material. In present invention, the inert core with high intensity, high tenacity, high temperature resistance and no chalking is coated by nickel oxide which is an active material, thereby overcoming the problem of volume changing and chalking of nickel oxide during charging/discharging and obtaining a better cycling performance. On the other hand, since the active material of nickel oxide is distributed over the outer surface of the coated composite anode material, the lithium ions are therefore not necessary to pass through the outer coating layer into the core for intercalation/deintercalation, and the rate performance of the composite anode material is thus not affected.

DETAILED DESCRIPTION OF PREFERRED EMBODIMENTS

Figure 1:
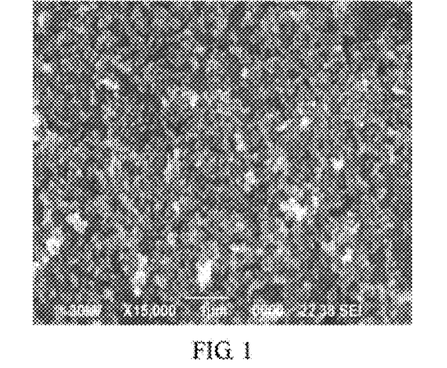
FIG. 1 is the SEM photograph of uncoated silicon carbide (SiC)
Figure 2:
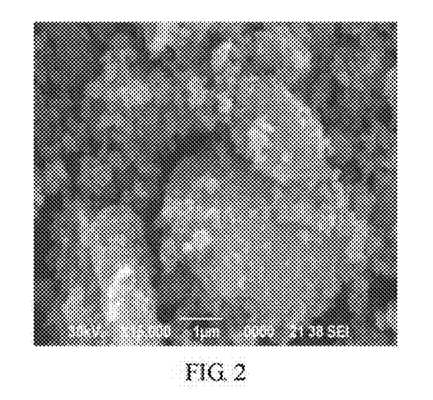
FIG. 2 is the SEM photograph of sample-1 of the composite anode material including nickel oxide as prepared in embodiment 1.
Figure 3:
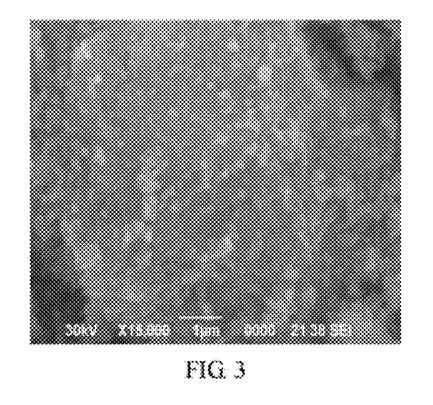
FIG. 3 is the SEM photograph of sample-2 of the composite anode material including nickel oxide as prepared in embodiment 2.
Figure 4:
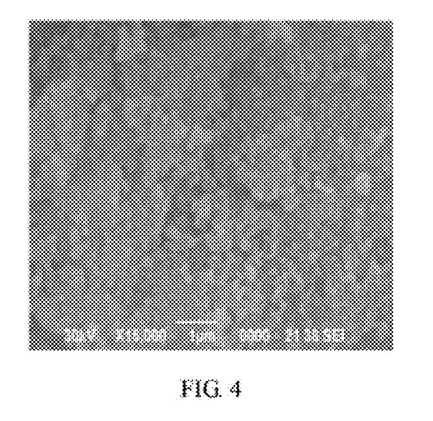
FIG. 4 is the SEM photograph of sample-3 of the composite anode material including nickel oxide as prepared in embodiment 3.
Figure 5:
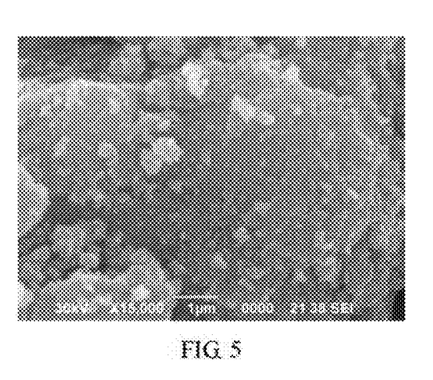
FIG. 5 is the SEM photograph of sample-4 of the composite anode material including nickel oxide as prepared in embodiment 4.
Figure 6:
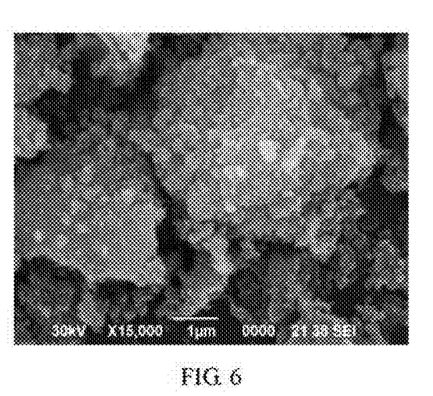
FIG. 6 is the SEM photograph of sample-5 of the composite anode material including nickel oxide as prepared in embodiment 5.
Figure 7:
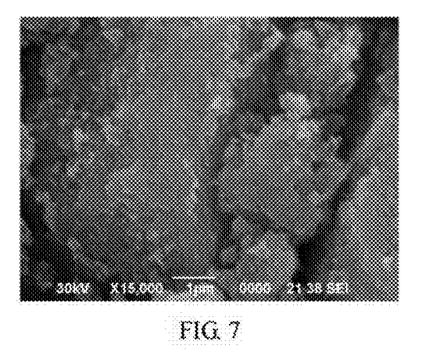
FIG. 7 is the SEM photograph of sample-6 of the composite anode material including nickel oxide as prepared in embodiment 6.
Figure 8:
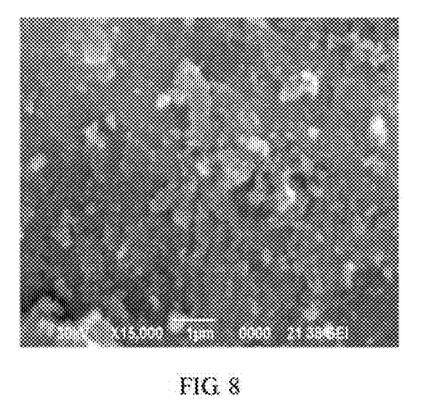
FIG. 8 is the SEM photograph of sample-7 of the composite anode material including nickel oxide as prepared in embodiment 7.
Figure 9:
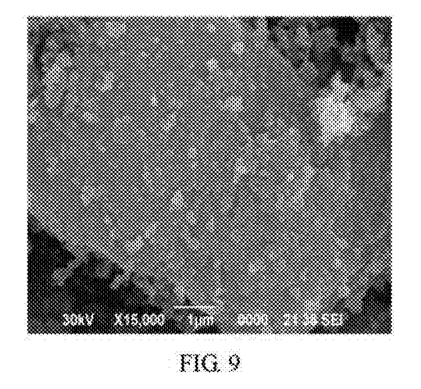
FIG. 9 is the SEM photograph of sample-8 of the composite anode material including nickel oxide as prepared in embodiment 8.
Figure 10:
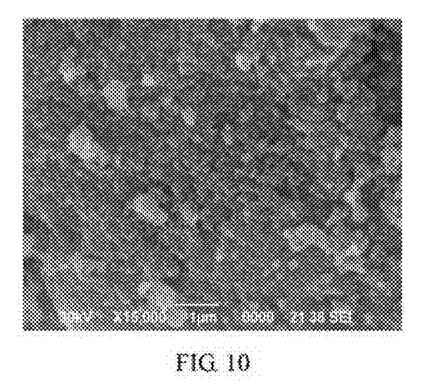
FIG. 10 is the SEM photograph of sample-9 of the composite anode material including nickel oxide as prepared in embodiment 9.
Figure 11:
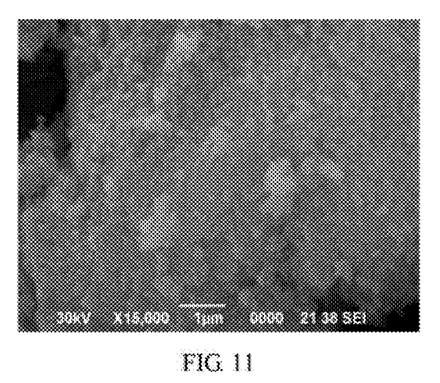
FIG. 11 is the SEM photograph of sample-10 of the composite anode material including nickel oxide as prepared in embodiment 10.
Figure 12:
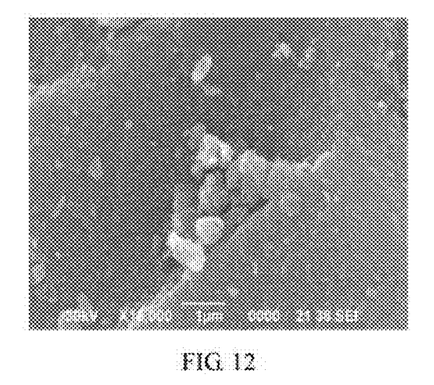
FIG. 12 is the SEM photograph of sample-11 of the composite anode material including nickel oxide as prepared in embodiment 11.
Figure 13:
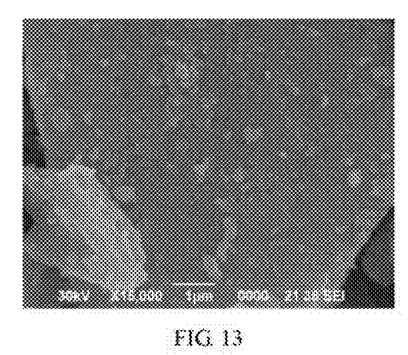
FIG. 13 is the SEM photograph of sample-12 of the composite anode material including nickel oxide as prepared in embodiment 12.
Figure 14:
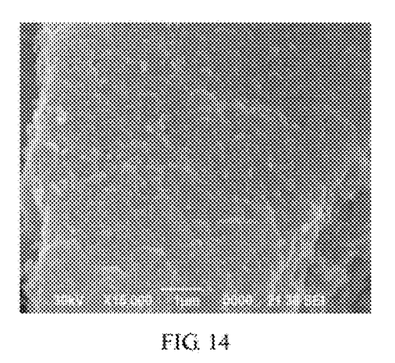
FIG. 14 is the SEM photograph of sample-13 of the composite anode material including nickel oxide as prepared in embodiment 13.
Figure 15:
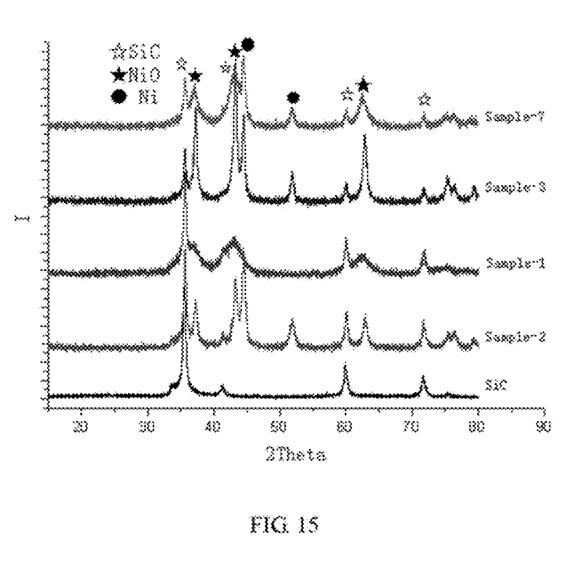
FIG. 15 is the XRD pattern of uncoated SiC and the composite anode material including nickel oxide as prepared in embodiments 1, 2, 3, 7.
Figure 16:
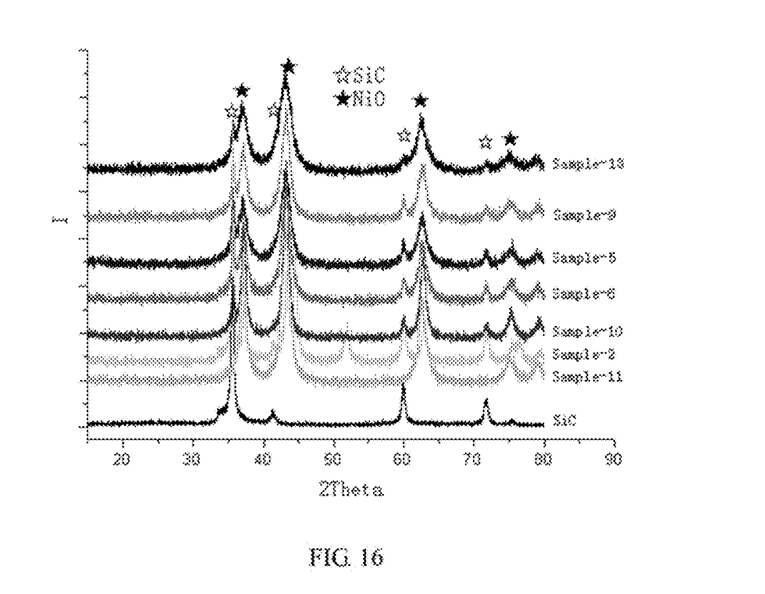
FIG. 16 is the XRD pattern of the uncoated SiC and the composite anode material including nickel oxide as prepared in embodiments 2, 5, 6, 9, 10, 11, 13.
Figure 17:
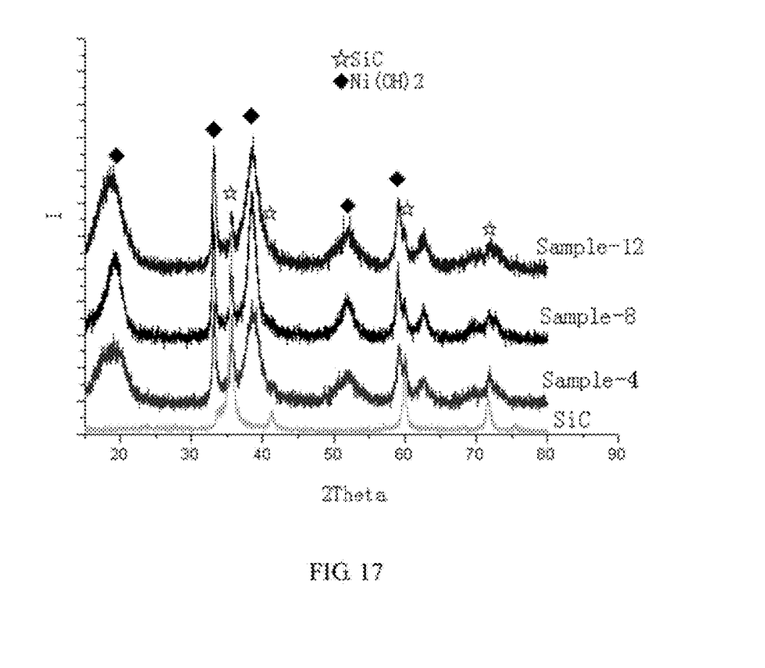
FIG. 17 is the XRD pattern of the uncoated SiC and the composite anode material including nickel oxide as prepared in embodiments 4, 8, 12.
Figure 18:
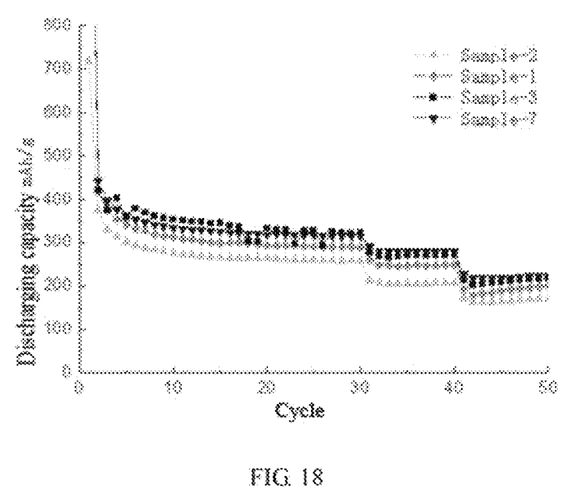
FIG. 18 is the electric performance test results of the coin cell including the composite anode material including nickel oxide as prepared in embodiments 1, 2, 3, 7.
Figure 19:
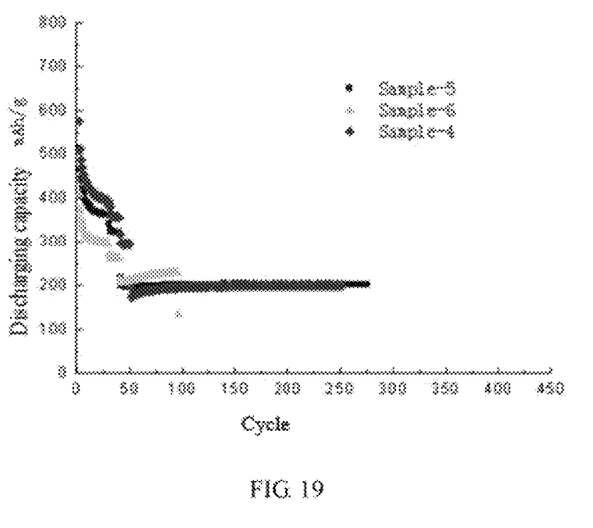
FIG. 19 is the electric performance test results of the coin cell including the composite anode material including nickel oxide as prepared in embodiments 4, 5, 6.
Figure 20:
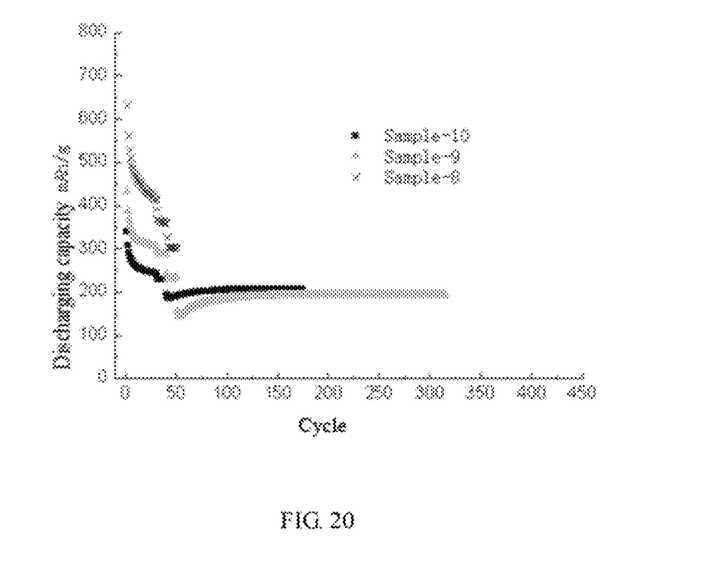
FIG. 20 is the electric performance test results of the coin cell including the composite anode material including nickel oxide as prepared in embodiments 8, 9, 10.
Figure 21:
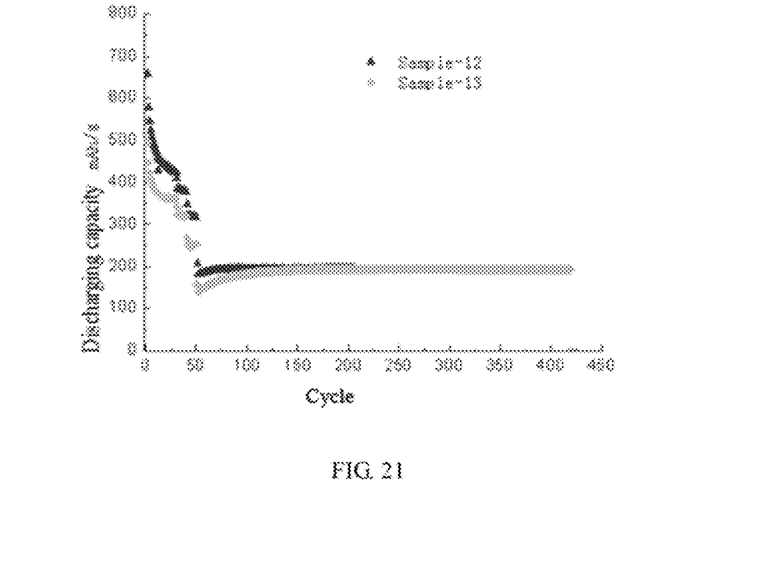
FIG. 21 is the electric performance test results of the coin cell including the composite anode material including nickel oxide as prepared in embodiments 12, 13.
Figure 22:
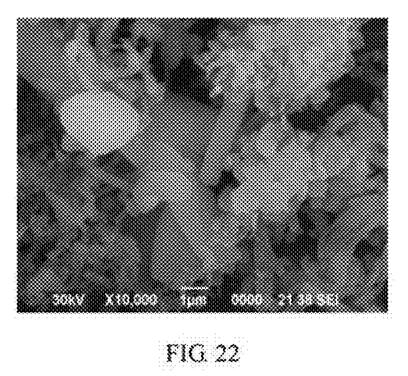
FIG. 22 is the SEM photograph of uncoated silicon nitride ($Si_3N_4$)
Figure 23:
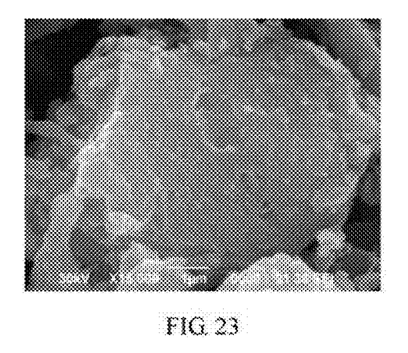
FIG. 23 is the SEM photograph of sample-14 of the composite anode material including nickel oxide as prepared in embodiment 14.
Figure 24:
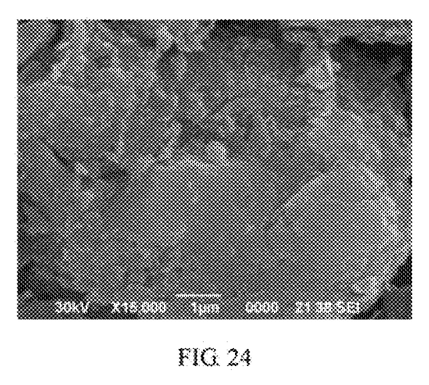
FIG. 24 is the SEM photograph of sample-15 of the composite anode material including nickel oxide as prepared in embodiment 15.
Figure 25:
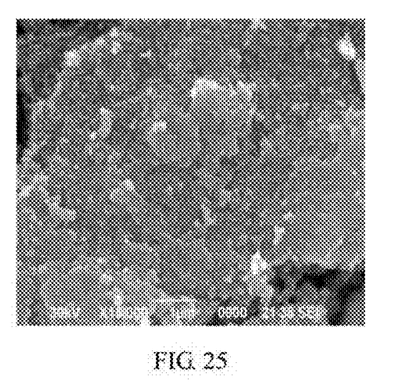
FIG. 25 is the SEM photograph of sample-16 of the composite anode material including nickel oxide as prepared in embodiment 16.
Figure 26:
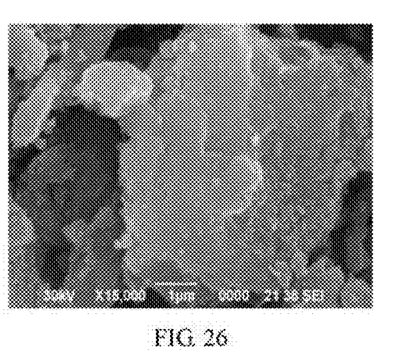
FIG. 26 is the SEM photograph of sample-17 of the composite anode material including nickel oxide as prepared in embodiment 17.
Figure 27:
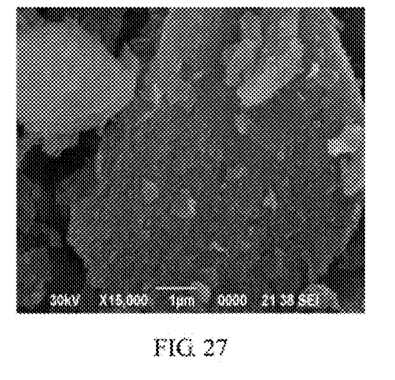
FIG. 27 is the SEM photograph of sample-18 of the composite anode material including nickel oxide as prepared in embodiment 18.
Figure 28:
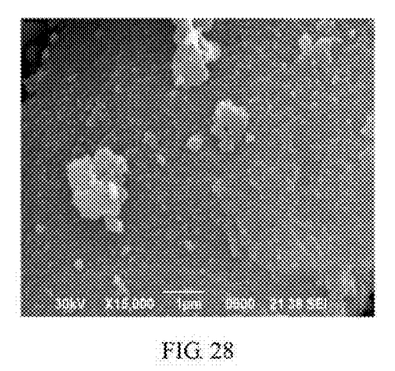
FIG. 28 is the SEM photograph of sample-19 of the composite anode material including nickel oxide as prepared in embodiment 19.
Figure 29:
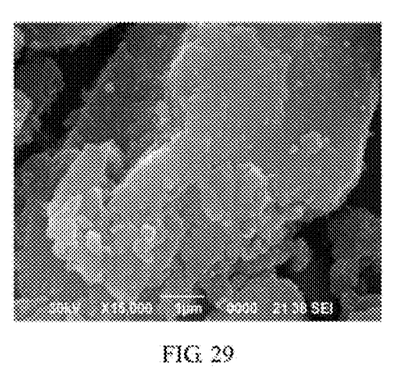
FIG. 29 is the SEM photograph of sample-20 of the composite anode material including nickel oxide as prepared in embodiment 20.
Figure 30:
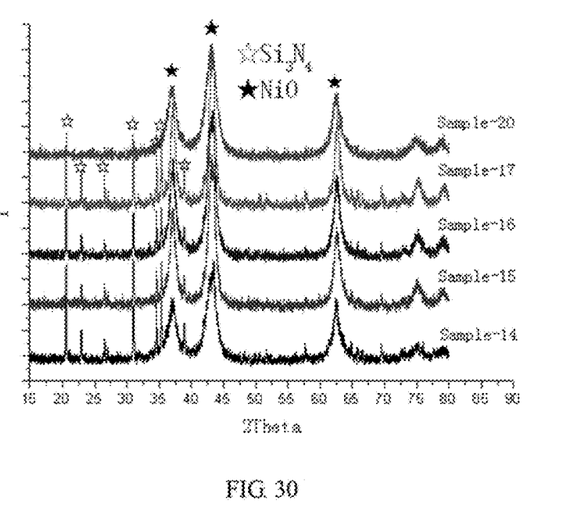
FIG. 30 is the XRD pattern of the uncoated $Si_3N_4$ and the composite anode material including nickel oxide as prepared in embodiments 14, 15, 16, 17, 20.
Figure 31:
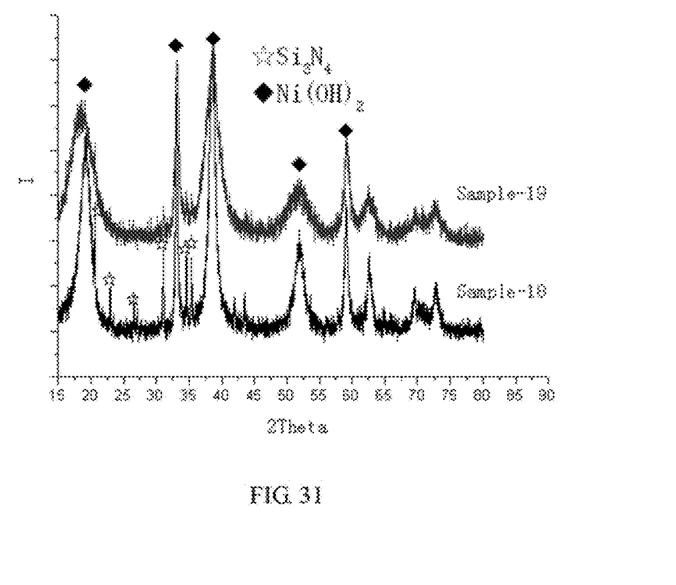
FIG. 31 is the XRD pattern of the uncoated $Si_3N_4$ and the composite anode material including nickel oxide as prepared in embodiments 18, 19.
Figure 32:
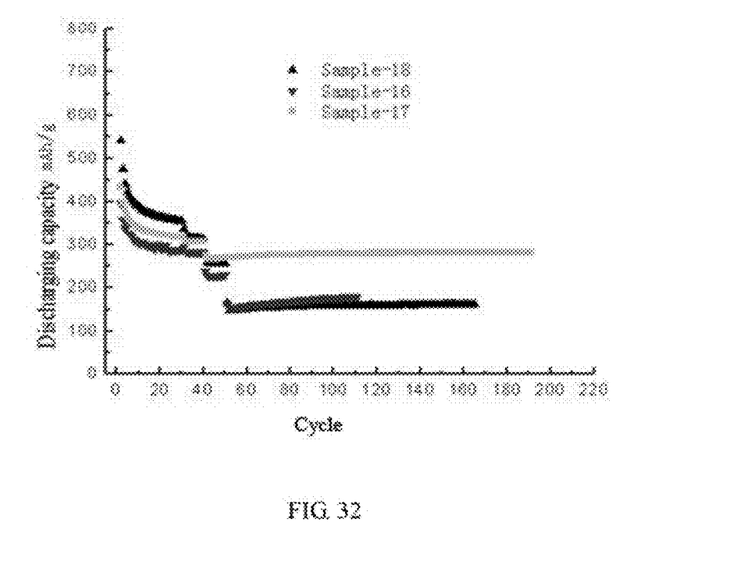
FIG. 32 is the electric performance test results of the coin cell including the composite anode material including nickel oxide as prepared in embodiments 16, 17, 18.
Figure 33:
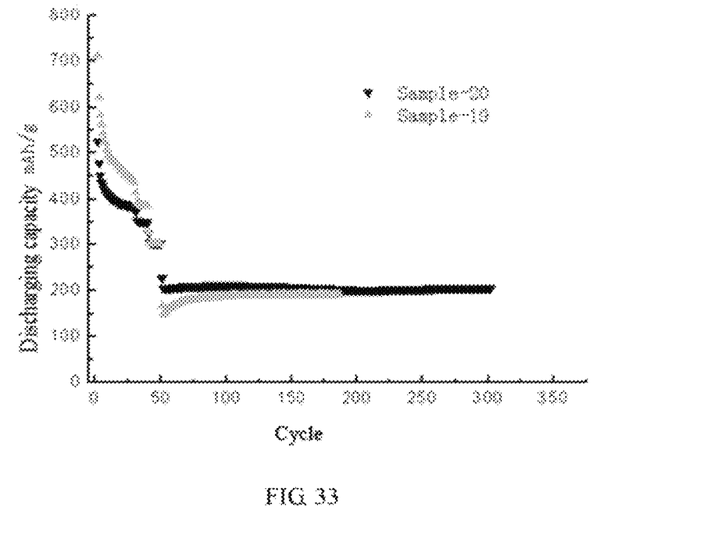
FIG. 33 is the electric performance test results of the coin cell including the composite anode material including nickel oxide as prepared in embodiments 19, 20.
Figure 34:
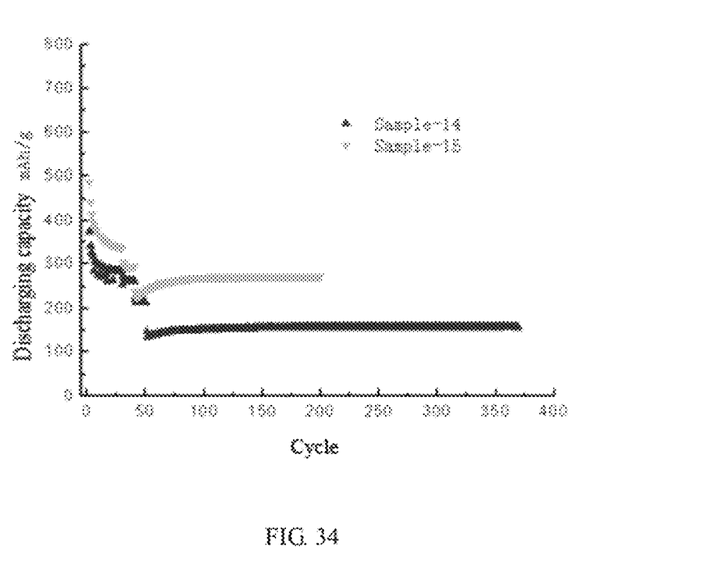
FIG. 34 is the electric performance test results of the coin cell including the composite anode material including nickel oxide as prepared in embodiments 14, 15.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed. Referring to FIGS. 1-34 respectively, detailed explanation to preferred embodiments of the present invention is as follows.

Embodiments 1-13

Firstly, the silicon carbide (SiC) is hydroxylated by ammonia, wherein 6.24 g SiC, 50 g ammonia, 30 g deionized water are separately added into a beaker and stirred about 3.5 h, then heated to 50° C., and then dried for later use.

Secondly, according to the table given below, $NiCl_2 \cdot 6H_2O$, NaOH, $H_2O$, and SiC are separately weighed, an aqueous solution of $NiCl_2 \cdot 6H_2O$ and an aqueous solution of NaOH are separately prepared, then adding SiC into the aqueous solution of $NiCl_2 \cdot 6H_2O$ and stirring, dropping the aqueous solution of NaOH into the aqueous solution of $NiCl_2 \cdot 6H_2O$ at the speed of 60 ml/h, stirring about 2 h after the dropping is finished, filtering and washing it, finally drying at 100° C. to obtain the intermediate products (IP).

| $NiCl_2 \cdot 6H_2O$ + $H_2O$/g | NaOH + $H_2O$/g | SiC/g | IP |
|---|---|---|---|
| 5.965 + 60 | 2.008 + 40 | 1.6 | IP-1 |
| 17.17 + 173 | 5.781 + 115 | 1.6 | IP-2 |
| 26.75 + 268 | 9.007 + 180 | 1.6 | IP-3 |
| 26.75 + 268 | 9.007 + 180 | 0 | IP-4 |
| 6.688 + 67.27 | 2.251 + 44.8 | 0.25 | IP-5 |

Thirdly, sintering the intermediate products to prepare the composite anode materials, the sintering conditions as below, the heating rate is 5° C./min.

| IP | sintering temperature/° C. | sintering time/h | sintering atmosphere | composite anode materials |
|---|---|---|---|---|
| IP-1 | 400 | 2 | $H_2$ | Sample-1 |
|  | 300 | 2 | $H_2$ | Sample-2 |
| IP-2 | 300 | 2 | $H_2$ | Sample-3 |
|  | 200 | 2 | Ar | Sample-4 |
|  | 300 | 2 | Ar | Sample-5 |
|  | 350 | 2 | Ar | Sample-6 |
| IP-3 | 300 | 2 | $H_2$ | Sample-7 |
|  | 200 | 2 | Ar | Sample-8 |
|  | 300 | 2 | Ar | Sample-9 |
|  | 350 | 2 | Ar | Sample-10 |
| IP-4 | 300 | 2 | Ar | Sample-11 |
|  | 200 | 2 | Ar | Sample-12 |
| IP-5 | 300 | 2 | Ar | Sample-13 |

Preparation of coin cells: mixing each of the composite anode materials with conductive carbon black and NMP (n-methyl-2-pyrrolidone) solution of PVDF (polyvinylidene fluoride), coating, drying, cutting piece, vacuum drying, and then coin cells are prepared for the electric performance tests.

Embodiments 14-20

Firstly, the silicon nitride ($Si_3N_4$) is hydroxylated by ammonia, wherein 4.525 g $Si_3N_4$, 36 g ammonia, 22 g deionized water are separately added into a beaker and stirred about 2 h, then heated to 50° C., and then dried for later use.

Secondly, according to the table given below, $NiCl_2 \cdot 6H_2O$, NaOH, $H_2O$, and $Si_3N_4$ are separately weighed, an aqueous solution of $NiCl_2 \cdot 6H_2O$ and an aqueous solution of NaOH are separately prepared, then adding $Si_3N_4$ into the aqueous solution of $NiCl_2 \cdot 6H_2O$ and stirring, dropping the aqueous solution of NaOH into the aqueous solution of $NiCl_2 \cdot 6H_2O$ at the speed of 60 ml/h, stirring about 2 h after the dropping is finished, filtering and washing it, finally drying at 100° C. to obtain the intermediate products (IP).

| $NiCl_2 \cdot 6H_2O$ + $H_2O$/g | NaOH + $H_2O$/g | $Si_3N_4$/g | IP |
|---|---|---|---|
| 10 + 100 | 3.37 + 67 | 1 | IP-6 |
| 28.088 + 280 | 9.466 + 188 | 1.132 | IP-7 |
| 7.334 + 74 | 2.468 + 49 | 0.1 | IP-8 |

Thirdly, sintering the intermediate products to prepare the composite anode materials, the sintering conditions as below, the heating rate is 5° C./min.

| IP | sintering temperature/° C. | sintering time/h | sintering atmosphere | composite anode materials |
|---|---|---|---|---|
| IP-6 | 300 | 2 | Ar | Sample-14 |
|  | 350 | 2 | Ar | Sample-15 |
| IP-7 | 300 | 2 | Ar | Sample-16 |
|  | 350 | 2 | Ar | Sample-17 |
|  | 200 | 2 | Ar | Sample-18 |
| IP-8 | 200 | 2 | Ar | Sample-19 |
|  | 300 | 2 | Ar | Sample-20 |

Preparation of coin cells: mixing each of the composite anode materials with conductive carbon black and NMP (n-methyl-2-pyrrolidone) solution of PVDF (polyvinylidene fluoride), coating, drying, cutting piece, vacuum drying, and then coin cells are prepared for the electric performance tests.

What is claimed is:

1. A composite anode material including nickel oxide, wherein the composite anode material has a core-shell structure, the core-shell structure is a two-layer structure consisting of an inner core and an outer shell coated on the inner core, the inner core is an inert core comprising a non-active material, the non-active material has a capacity of less than 50 mAh/g and is at least one selected from the group consisting of crystalline silicon carbide, silicon nitride and calcium carbonate, and the outer shell comprises an anode active material of nickel oxide.

2. The composite anode material including nickel oxide of claim 1, wherein the outer shell further comprises nickel hydroxide.

3. The composite anode material including nickel oxide of claim 1, wherein a radius of the inner core is between 5 nm and 200 nm.

4. The composite anode material including nickel oxide of claim 3, wherein the radius of the inner core is between 10 nm and 100 nm.

5. The composite anode material including nickel oxide of claim 1, wherein a thickness of the outer shell is between 1 nm and 200 nm.

6. The composite anode material including nickel oxide of claim 5, wherein the thickness of the outer shell is between 3 nm and 100 nm.

7. A lithium ion battery, comprising the composite anode material including nickel oxide of claim 1.

* * * * *